(12) United States Patent
Ghoshal et al.

(10) Patent No.: US 9,161,209 B1
(45) Date of Patent: Oct. 13, 2015

(54) MULTI-STEP MOBILE DEVICE INITIATION WITH INTERMEDIATE PARTIAL RESET

(71) Applicant: Sprint Communications Company L.P., Overland Park, KS (US)

(72) Inventors: Jagannath Ghoshal, Overland Park, KS (US); John D. Sumler, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 90 days.

(21) Appl. No.: 13/972,827

(22) Filed: Aug. 21, 2013

(51) Int. Cl.
*H04W 8/20* (2009.01)

(52) U.S. Cl.
CPC ........................................ *H04W 8/20* (2013.01)

(58) Field of Classification Search
CPC . H04L 41/08; H04L 41/0803; H04L 41/0806; H04L 67/34
USPC ........... 455/418, 419, 420; 707/771, 755, 708
See application file for complete search history.

(56) References Cited

U.S. PATENT DOCUMENTS

| | | | |
|---|---|---|---|
| 6,131,024 A | 10/2000 | Boltz | |
| 7,165,191 B1 | 1/2007 | Vakrat | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |
| 8,825,039 B2 | 9/2014 | Mizuguchi | |
| 8,909,291 B1 | 12/2014 | Spanel et al. | |
| 9,026,105 B2 | 5/2015 | Shipley et al. | |
| 9,042,877 B1 | 5/2015 | Ghoshal et al. | |
| 2002/0091931 A1 | 7/2002 | Quick, Jr. et al. | |

(Continued)

FOREIGN PATENT DOCUMENTS

| WO | WO2012078753 A1 | 6/2012 |
|---|---|---|
| WO | WO2013169983 A1 | 11/2013 |

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Kashif Siddiqui
*Assistant Examiner* — Obidon Bassinan

(57) ABSTRACT

A mobile communications device. The device comprises a memory, a processor; and an application stored in the memory that, when executed by the processor, receives a software payload from a provider, parses the software payload into nodes, accesses the first set of files according to a first set of nodes, changes at least one value within the first set of files, accesses the second set of files according to a second set of nodes, and reconfigures the second set of files, without altering the first set of files.

20 Claims, 7 Drawing Sheets

(56) References Cited

U.S. PATENT DOCUMENTS

| | | | |
|---|---|---|---|
| 2003/0217145 A1 | 11/2003 | Leung et al. | |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2004/0261041 A1 | 12/2004 | Parakkuth et al. | |
| 2005/0079855 A1 | 4/2005 | Jethi et al. | |
| 2005/0085222 A1* | 4/2005 | Przybilski et al. | 455/418 |
| 2005/0119001 A1 | 6/2005 | Watanabe | |
| 2005/0188262 A1 | 8/2005 | Rosenman et al. | |
| 2005/0197098 A1 | 9/2005 | Trossen | |
| 2006/0025151 A1 | 2/2006 | Karaoguz et al. | |
| 2006/0135144 A1 | 6/2006 | Jothipragasam | |
| 2006/0154651 A1 | 7/2006 | Knowles | |
| 2006/0203722 A1 | 9/2006 | Oommen | |
| 2006/0208071 A1 | 9/2006 | Chang et al. | |
| 2006/0235944 A1 | 10/2006 | Haslam | |
| 2006/0236325 A1 | 10/2006 | Rao et al. | |
| 2006/0246949 A1 | 11/2006 | Gupta et al. | |
| 2007/0004404 A1 | 1/2007 | Buckley et al. | |
| 2007/0082655 A1 | 4/2007 | Link, II et al. | |
| 2007/0099599 A1 | 5/2007 | Smith et al. | |
| 2007/0129057 A1 | 6/2007 | Xu et al. | |
| 2007/0130156 A1 | 6/2007 | U. Tenhunen et al. | |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0197234 A1 | 8/2007 | Gill et al. | |
| 2007/0250645 A1 | 10/2007 | Meadows et al. | |
| 2007/0254635 A1 | 11/2007 | Montelius | |
| 2008/0039114 A1 | 2/2008 | Phatak et al. | |
| 2008/0046583 A1 | 2/2008 | Rao | |
| 2008/0046880 A1 | 2/2008 | Jun et al. | |
| 2008/0046997 A1 | 2/2008 | Wang | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0167027 A1 | 7/2008 | Gautier et al. | |
| 2008/0171532 A1 | 7/2008 | Shieh et al. | |
| 2008/0225806 A1 | 9/2008 | Arian et al. | |
| 2008/0281511 A1 | 11/2008 | Miyata | |
| 2008/0318547 A1 | 12/2008 | Ballou, Jr. et al. | |
| 2009/0061840 A1 | 3/2009 | Fleischman et al. | |
| 2009/0093242 A1 | 4/2009 | Bhalekar et al. | |
| 2009/0094350 A1* | 4/2009 | Rive et al. | 709/220 |
| 2009/0106200 A1 | 4/2009 | Salinas et al. | |
| 2009/0124250 A1 | 5/2009 | Topaltzas et al. | |
| 2009/0156209 A1 | 6/2009 | Franklin et al. | |
| 2009/0239518 A1 | 9/2009 | Feuillette | |
| 2009/0247124 A1 | 10/2009 | de Atley et al. | |
| 2009/0260004 A1 | 10/2009 | Datta et al. | |
| 2009/0307763 A1 | 12/2009 | Rawlins et al. | |
| 2010/0048193 A1 | 2/2010 | Ortion et al. | |
| 2010/0060456 A1 | 3/2010 | Forster | |
| 2010/0075669 A1 | 3/2010 | Sparks et al. | |
| 2010/0080143 A1 | 4/2010 | Topaltzas et al. | |
| 2010/0133335 A1 | 6/2010 | Maguid et al. | |
| 2010/0136960 A1 | 6/2010 | Knezevic | |
| 2010/0159876 A1 | 6/2010 | Brown et al. | |
| 2010/0161724 A1 | 6/2010 | Sathyan et al. | |
| 2010/0167696 A1 | 7/2010 | Smith et al. | |
| 2010/0192120 A1 | 7/2010 | Raleigh | |
| 2010/0203864 A1 | 8/2010 | Howard | |
| 2010/0207742 A1 | 8/2010 | Buhot et al. | |
| 2010/0222047 A1 | 9/2010 | Vanderlinden et al. | |
| 2010/0262638 A1 | 10/2010 | Fitzgerald | |
| 2010/0291898 A1* | 11/2010 | Sanding et al. | 455/411 |
| 2010/0311404 A1 | 12/2010 | Shi et al. | |
| 2010/0312794 A1 | 12/2010 | Liu | |
| 2010/0325622 A1 | 12/2010 | Morton | |
| 2010/0332639 A1 | 12/2010 | Diaz et al. | |
| 2011/0003590 A1 | 1/2011 | Yoon et al. | |
| 2011/0014913 A1 | 1/2011 | Yoon et al. | |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1 | 2/2011 | Laird-McConnell et al. | |
| 2011/0081885 A1 | 4/2011 | Sennett et al. | |
| 2011/0119716 A1 | 5/2011 | Coleman, Sr. | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0208338 A1 | 8/2011 | Eteminan et al. | |
| 2011/0222404 A1 | 9/2011 | Watson et al. | |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0296399 A1* | 12/2011 | Tugnawat et al. | 717/174 |
| 2011/0306318 A1 | 12/2011 | Rodgers et al. | |
| 2011/0314129 A1 | 12/2011 | Rezaiifar et al. | |
| 2012/0027059 A1 | 2/2012 | Zhao et al. | |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0094684 A1 | 4/2012 | Reddy | |
| 2012/0106509 A1 | 5/2012 | Klingenbrunn et al. | |
| 2012/0129513 A1 | 5/2012 | van der Laak | |
| 2012/0129572 A1 | 5/2012 | Johnstone et al. | |
| 2012/0135733 A1 | 5/2012 | Cormier et al. | |
| 2012/0158580 A1 | 6/2012 | Eram et al. | |
| 2012/0203824 A1 | 8/2012 | Oommen | |
| 2012/0208511 A1 | 8/2012 | Vanderlinden et al. | |
| 2012/0230587 A1 | 9/2012 | Arseneau | |
| 2012/0260095 A1 | 10/2012 | Von Hauck et al. | |
| 2012/0276872 A1 | 11/2012 | Knauth et al. | |
| 2012/0282891 A1 | 11/2012 | Mohammed et al. | |
| 2012/0282924 A1 | 11/2012 | Tagg et al. | |
| 2013/0023235 A1 | 1/2013 | Fan et al. | |
| 2013/0031191 A1 | 1/2013 | Bott | |
| 2013/0031234 A1 | 1/2013 | Alfano et al. | |
| 2013/0046951 A1 | 2/2013 | Jones | |
| 2013/0065578 A1 | 3/2013 | Raleigh et al. | |
| 2013/0072168 A1 | 3/2013 | Colucciello et al. | |
| 2013/0085914 A1 | 4/2013 | McPherson et al. | |
| 2013/0111461 A1 | 5/2013 | Zubas et al. | |
| 2013/0198567 A1 | 8/2013 | Ahmed et al. | |
| 2013/0222395 A1 | 8/2013 | Blas, Jr. | |
| 2013/0303142 A1 | 11/2013 | Burcham et al. | |
| 2013/0310003 A1 | 11/2013 | Sadhvani et al. | |
| 2013/0311836 A1 | 11/2013 | Hurst et al. | |
| 2014/0045483 A1 | 2/2014 | Whidden | |
| 2014/0080467 A1 | 3/2014 | Urbanek | |
| 2014/0113610 A1 | 4/2014 | Ramprasad et al. | |
| 2014/0206313 A1 | 7/2014 | Spanel et al. | |
| 2014/0228012 A1 | 8/2014 | Annan et al. | |
| 2014/0228042 A1 | 8/2014 | Annan et al. | |
| 2014/0274032 A1 | 9/2014 | Shipley et al. | |
| 2014/0373184 A1 | 12/2014 | Mahaffey et al. | |
| 2015/0065105 A1 | 3/2015 | Masterson et al. | |
| 2015/0111564 A1 | 4/2015 | Urbanek | |
| 2015/0111565 A1 | 4/2015 | Urbanek | |

FOREIGN PATENT DOCUMENTS

| | | |
|---|---|---|
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 10/2014 |
| WO | WO2015030945 A1 | 3/2015 |
| WO | WO2015060965 A2 | 4/2015 |

OTHER PUBLICATIONS

Notice of Allowance dated Nov. 2, 2012, U.S. Appl. No. 13/556,202, filed Jul. 24, 2012.

Notice of Allowance dated Jun. 11, 2013, U.S. Appl. No. 13/752,386, filed Jan. 28, 2013.

FAIPP Pre-Interview Communication dated Feb. 25, 2013, U.S. Appl. No. 13/149,505, filed May 31, 2013.

(56) References Cited

OTHER PUBLICATIONS

First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
FAIPP Pre-Interview Communication dated Sep. 22, 2014, U.S. Appl. No. 13/468,028, filed May 9, 2013.
First Action Interview Office Action dated Mar. 16, 2015, U.S. Appl. No. 13/468,028, filed May 9, 2013.
FAIPP Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
FAIPP Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
Office Action dated Mar. 2, 2015, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Mar. 26, 2015, U.S. Appl. No. 14/522,586, filed Oct. 24, 2014.
FAIPP Pre-Interview Communication dated Jul. 16, 2014, U.S. Appl. No. 13/744,861, filed Jan. 18, 2013.
Notice of Allowance dated Nov. 20, 2014, U.S. Appl. No. 13/744,861, filed Jan. 18, 2013.
FAIPP Pre-Interview Communication dated Apr. 8, 2015, U.S. Appl. No. 13/844,104, filed Mar. 15, 2013.
FAIPP Pre-Interview Communication dated Oct. 22, 2014, U.S. Appl. No. 13/763,428, filed Feb. 8, 2013.
Notice of Allowance dated Mar. 20, 2015, U.S. Appl. No. 13/763,428, filed Feb. 8, 2013.
FAIPP Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Notice of Allowance dated Mar. 26, 2015, U.S. Appl. No. 13/763,434, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
FAIPP Pre-Interview Communication dated Nov. 20, 2014, U.S. Appl. No. 13/899,566, filed May 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736, filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication from a Related Counterpart—International Preliminary Report on Patentability, dated Apr. 2, 2015, PCT/US13/55023, filed on Aug. 15, 2013.
Foreign Communication From a Related Counterpart Application, International Search Report and Written Opinion dated Jan. 24, 2014, PCT/US13/68981, filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, "Preliminary Report on Patentability," dated Nov. 20, 2014, PCT/US13/40278, filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed on Sep. 22, 2014.
Delker, Jason R., "Loading Branded Media Outside System Partition," filed Oct. 30, 2013, U.S. Appl. No. 14/066,947.
Mauer, Brian D., et al., "Automatic Branding of Generic Applications," filed Jan. 10, 2013, U.S. Appl. No. 14/152,627.
Spaniel, Robert L., et al., "Dynamic Remotely Managed SIM Profile," U.S. Appl. No. 14/522,586, filed Oct. 24, 2014.
Annan, Brandon C., et al., "System and Method of Branding and Labeling a Mobile Device," filed Mar. 15, 2013, U.S. Appl. No. 13/844,104.
Annan, Brandon C., et al., "Electronic Fixed Brand Labeling," filed Feb. 8, 2013, U.S. Appl. No. 13/763,443.
Ghoshal, Jagannath, et al., "Rebranding a Portable Electronic Device While Maintaining User Data," filed May 22, 2013, U.S. Appl. No. 13/899,567.
Ghoshal, Jagannath, et al., "System and Method for Retrofitting a Branding Framework into a Mobile Communication Device," filed May 21, 2013, U.S. Appl. No. 13/899,566.
Urbanek, Robert E., "Delivery of Branding Content and Customizations to a Mobile Communication Device," filed Oct. 23, 2013, U.S. Appl. No. 14/060,712.
Urbanek, Robert E., "Delivery of Branding Content and Customizations to a Mobile Communication Device," filed Sep. 22, 2014, International Serial No. PCT/US14/56778.
Urbanek, Robert E., "Implementation of Remotely Hosted Branding Content and Customizations," filed Oct. 23, 2013, U.S. Appl. No. 14/085,474.
Urbanek, Robert E., "Subscriber Identity Module Virtualization," filed Nov. 20, 2013, U.S. Appl. No. 14/060,719.
Indurkar, Dhananjay, "System and Method of Branding a Device Independent of Device Activation," filed Jan. 24, 2014, U.S. Appl. No. 14/163,035.
Sumner, Bret D., "Directing Server Connection Based on Location Identifier," filed Aug. 15, 2013, U.S. Appl. No. 13/968,259.
Abou-El-Ella, Hassan, et al., "Segmented Customization Payload Delivery," filed Aug. 27, 2013, U.S. Appl. No. 14/010,518.
Sumner, Bret D., "Segmented Customization Package Within Distributed Server Architecture," filed Aug. 27, 2013, U.S. Appl. No. 14/010,522.
Masterson, Michelle E., et al., "Development and Testing of Payload Receipt by a Portable Electronic Device," filed Aug. 27, 2013, U.S. Appl. No. 14/010,523.
Callan, Jeffery S., et al., "Delivery of Oversized Branding Elements for Customization," filed Nov. 6, 2013, U.S. Appl. No. 14/073,321.

(56) References Cited

OTHER PUBLICATIONS

Indurkar, Dhananjay, "Background Delivery of Device Configuration and Branding," filed Jan. 16, 2014, U.S. Appl. No. 14/157,507.

Ahn, Chul Jin, et al., "Separation of Client Identification Composition from Customization Payload to Original Equipment Manufacturer Layer," filed Nov. 8, 2013, U.S. Appl. No. 14/075,687.

Ghoshal, Jagannath, et al., "Multiple Carrier Partition Dynamic Access on a Mobile Device," filed Jun. 5, 2014, U.S. Appl. No. 14/297,429.

Indurkar, Dhananjay, "Activation Sequence Using Permission Based Connection to Network," filed Jan. 24, 2014, U.S. Appl. No. 14/163,041.

Ahn, Chul Jin, et al., "Customization for Preloaded Applications," filed Mar. 31, 2014, U.S. Appl. No. 14/231,718.

Koller, Gary D., et al., "Out of the Box Experience (OOBE) Country Choice Using Wi-Fi Layer Transmission," filed Oct. 31, 2014, U.S. Appl. No. 14/530,666.

Blinn, Benjamin P., et al. "System and Method of Efficient Mobile Device Network Brand Customization," filed Sep. 2, 2014, U.S. Appl. No. 14/475,399.

Delker, Jason R., et al. "Subscriber Identity Module (SIM) Card Initiation of Custom Application Launcher Installation on a Mobile Communication Device," filed Mar. 4, 2015, U.S. Appl. No. 14/639,056.

Delker, Jason R., et al. "Network Access Tiered Based on Application Launcher Installation," filed Mar. 4, 2015, U.S. Appl. No. 14/639,060.

FAIPP Pre-Interview Communication dated Jun. 2, 2015, U.S. Appl. No. 14/152,627, filed Jan. 10, 2013.

Notice of Allowance dated Jul. 7, 2015, U.S. Appl. No. 14/522,586, filed Oct. 24, 2014.

FAIPP Pre-Interview Communication dated Apr. 23, 2014, U.S. Appl. No. 13/763,443, filed Feb. 8, 2013.

First Action Interview Office Action dated Jun. 16, 2014, U.S. Appl. No. 13/763,443, filed Feb. 8, 2013.

Office Action dated Jun. 16, 2015, U.S. Appl. No. 13/899,567, filed May 22, 2013.

Notice of Allowance dated May 29, 2015, U.S. Appl. No. 14/085,474, filed Nov. 20, 2013.

Notice of Allowance dated May 8, 2015, U.S. Appl. No. 14/010,518, filed Aug. 27, 2013.

Notice of Allowance dated Jul. 8, 2015, U.S. Appl. No. 14/010,522, filed Aug. 27, 2013.

Notice of Allowance dated Jun. 26, 2015, U.S. Appl. No. 14/010,523, filed Aug. 27, 2013.

Notice of Allowance dated Apr. 28, 2015, U.S. Appl. No. 14/010,524, filed Aug. 27, 2013.

Restriction Requirement dated May 21, 2015, U.S. Appl. No. 14/073,321, filed Nov. 6, 2013.

FAIPP Pre-Interview Communication dated Jul. 8, 2015, U.S. Appl. No. 14/475,399, filed Sep. 2, 2014.

Amazon Kindle e-book reader, on public sale 2007, http://en.wikipedia.org/wiki/Amazon_Kindle. last accessed on Apr. 13, 2015.

* cited by examiner

MULTI-STEP MOBILE DEVICE INITIATION WITH INTERMEDIATE PARTIAL RESET

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices may be selectively reconfigured for operation across multiple telecommunications networks by a user. For example, a user may choose to switch network providers to gain the benefit of price differentials, to obtain differentiated services, and/or to obtain coverage in a geographic area that is available from one provider that is not available from other providers. Generally, reconfiguring mobile devices includes resetting the mobile device's operating system to the factory default settings. As the mobile phone is reactivated on a new provider, a series of processes for installing or reinstalling applications and services associated with accessing the new provider's mobile communications network is initiated. During the reactivation process user information relevant to certain applications may be reset, eliminated, or lost from the mobile device.

SUMMARY

In an embodiment a mobile communication device is disclosed. The mobile communication device comprises a memory, a processor, and an application stored in the memory. When executed by the processor, the application receives a software payload from a provider, parses the software payload into nodes, accesses a first set of files according to a first set of nodes, changes at least one value within the first set of files, accesses a second set of files according to a second set of nodes, and reconfigures the second set of files.

In an embodiment, a method for reconfiguring a mobile telecommunications device is disclosed. The method relates to partially resetting a mobile device to the factory default settings. The method comprises receiving a software payload from a provider, parsing the software payload into nodes, accessing a first set of files associated with a first set of nodes, resetting the first set of files, accessing a second set of files associated with a second set of nodes, and changing at least one value within the second set of files. In some configurations, the method comprises accessing a telecommunications network and directing the user to a newly contracted service provider.

In an embodiment, a method for selectively resetting applications on a mobile device is disclosed. The method comprises, receiving a software payload on a mobile device, parsing the software payload, accessing a first set of application files, changing at least one value within the first set of application files, accessing and resetting a second set of application files. Generally, the first set of application files is unchanged or preserved during the step of resetting the second set of application files.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
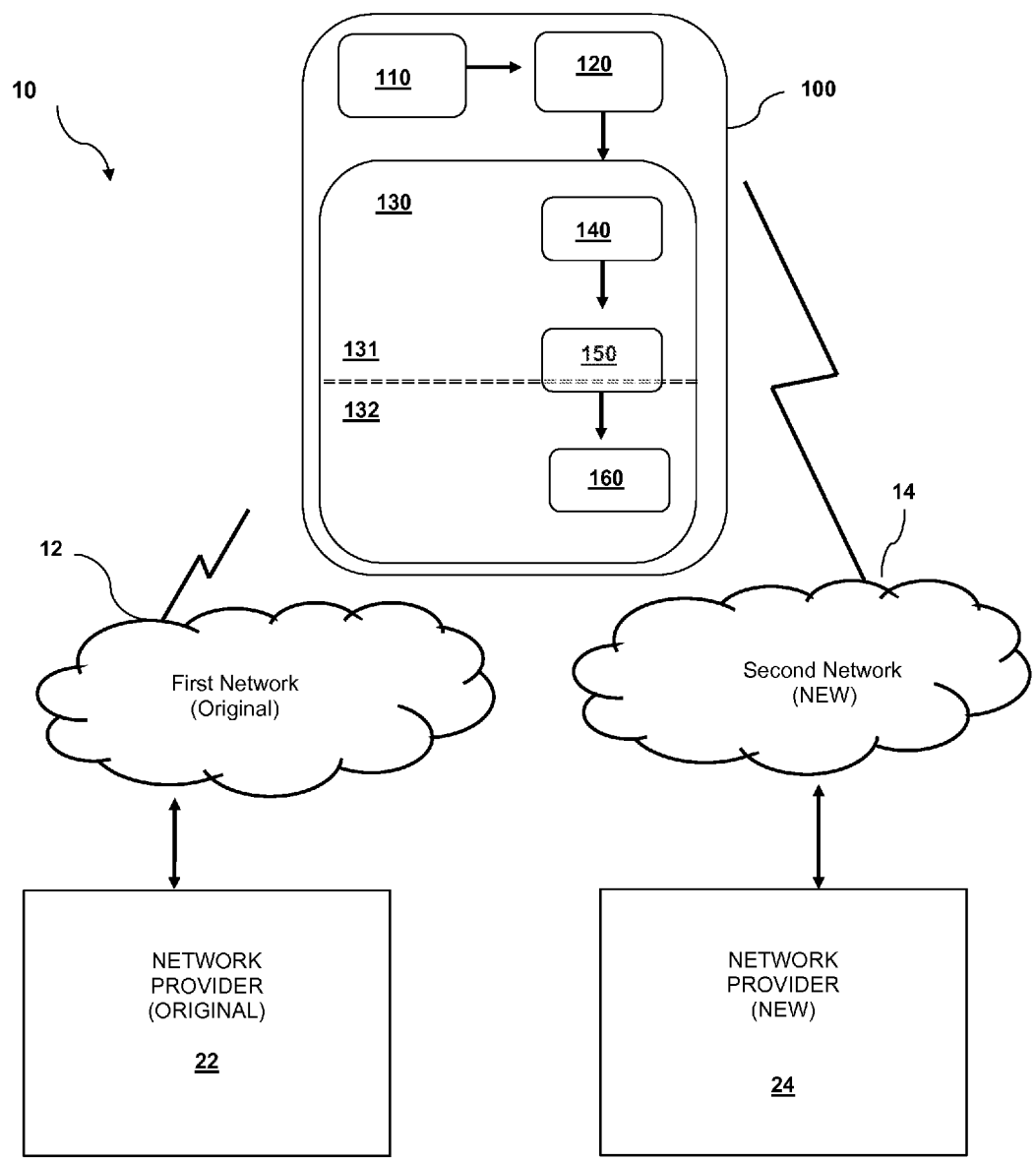
FIG. 1 illustrates an exemplary mobile telecommunications system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The development of generic, shared, or open-source operating systems and applications in mobile devices has permitted manufacturers to decouple hardware from a contracted mobile telecommunications service provider. These generic operating systems were originally developed by a consortium of telecommunication companies in order to improve operations of mobile devices including mobile phones, personal digital assistants (PDA), media players, tablets, or other mobile communication devices without limitation. The improved operations include security protocols, software upgrades, managing device and system faults, and facilitating the reprovisioning or reconfiguring of the device. As used herein a "provider" is the user contracted telecommunications service provider and may include the separate subsidiaries, divisions, or entities within a larger corporation.

The generic operating systems loaded on the mobile devices have permitted consumers, hereinafter "users", to utilize their preferred device while seeking the benefit of price differentials, differentiated services, and/or to obtain coverage in a geographic area that is available from one provider, but not other providers. The same considerations may be associated with switching among brands supported by a single service provider, for example from a flagship brand supported by the provider to a subsidiary brand supported by the same provider, for example a brand that provides less expensive service plans or that is more popular among a segment of the population such as a youth market segment. More specifically, as a user transfers their contracted services to a new provider, the chosen provider only has to deliver a provider-specific software package. As such, the user does not have to bear the financial cost and inconvenience of switching between provider-specific, proprietary mobile devices in order to take advantage of the aforementioned price, service, and geographic differentials. Likewise, the providers and device manufacturers have increased flexibility to target user demand in smaller markets.

However, in order to facilitate the switch between providers or between brands supported by the same provider, known devices may be reset to factory default settings. Users changing their contracted service options may also involve resetting the device to default setting. Generally, resetting a device deletes the contents of a user memory partition. The user memory partition may contain most or all of a user's data on stored on the device, including the device-cached, user-saved, and third-party application data. The user memory may contain other information that applications may store, such as logs, history, cached values, and the like. The user experiences an inconvenience during a reset to factory default settings, because their preferred applications and user information may need to be reloaded onto the device after they have completed the switch between providers or service options within a single provider's offerings.

Further, there may be reusable data that is deleted during a reset resultant from a user choosing to switch providers. Specifically, the reusable data comprises data that is generic to the device, including country codes, network codes, client identification numbers, device identification numbers, phone numbers for mobile devices, or other data without limitation. These identification numbers may be assigned to a device from the Federal Communications Commission (FCC), other government agencies, or mobile applications companies. The latter including mobile services companies that supply mobile applications that are generic to the operating system, such as but not limited to short messaging services (SMS), date and time, and location and direction finding applications. Losing this information represents a potential burden to the provider, because this data must be resupplied to the user and/or reinstalled on the user's device before accessing the mobile network and completing activation. Thus, there exists a potential competitive advantage in the mobile telecommunications industry by permitting a user to switch providers while preserving the applications data, user information, and reusable data discussed hereinabove.

For example, the generic operating system discussed herein comprises the Open Mobile Alliance, Device Management (OMA-DM) protocol. This device management protocol is encoded by the Extensible Markup Language (XML) that permits provider specific delivery and implementation of instructions to the mobile device. Further, this device management protocol permits partitioning the memory of the mobile device such that the information for operating the hardware and the user specific information are stored in separate volumes. In instances, the memory is partitioned into a user partition and a carrier partition. The user partition comprises software and data that is loaded or installed on the device by the user during operation. The carrier partition comprising software and data that is loaded and implemented by a user's chosen provider. In instances, the memory also includes a system partition comprising software and data from the device manufacturer that is implemented in the operation of the device. Generally, the system partition is configured for read-only access.

The present disclosure relates to a means of configuring a mobile device for operation on a provider's mobile network while preserving the reusable data by executing a partial reset. Generally, the present disclosure relates to a multi-step process for supplying a mobile device a payload of software and applications, parsing the payload based on the data needed for functionality including identifying reusable data files, locating the associated data files, preserving or activating a portion of the data files, and resetting or deactivating a portion of the data files. Also, the multi-step process of the present disclosure relates to partially resetting a device, for example by changing a value within the reusable data files without uninstalling or deleting, and reinstalling the file, or moving the location of the data file. According to the teachings of the present disclosure, a partial reset may be performed using a radio modem reset instead of a system reset, a total device reset, or a processor reset. A radio modem reset may not cause user information to be deleted from a user memory partition of memory; a system reset typically does cause user information to be deleted from the user memory partition of memory, hence the user installed applications and possibly configuration settings would be deleted. A device configured and operated accordingly provides the user with a more efficient process for switching providers and for switching brands supported by the same provider relative to conventional means. More specifically, the user is not required to reset the device to a default setting, reinstall data files, or re-input information and desired applications.

For example, a mobile telecommunication reset system comprises an acquisition engine, a parsing engine, and an execution engine. The acquisition engine receives a payload of components, the parsing engine determines which components are compatible with a reconfiguration of a mobile device, and the execution engine either activates, reconfigures, resets or replaces, or deactivates select components. In some configurations, the acquisition engine, parsing engine, and execution engine are implemented as a processor executing software. More specifically, the system comprises software modules that partially reset and reconfigure a user's device in order to make it compatible with accessing a new telecommunication provider's network.

For example, a user input or a network signal initiates receiving a software payload. Receiving the software payload comprises receiving data from a telecommunications provider in order to reconfigure a mobile device for accessing that provider's mobile telecommunications network. Receiving the software payload further comprises receiving instructions for identifying software packages, hereinafter nodes, within the payload and on the device. Parsing the nodes comprises locating files that are associated with reusable data on the device. Accordingly, parsing the nodes further comprises locating files that are not associated with reusable data on the device. In some configurations, parsing the nodes further comprises locating deactivated or archived files that are associated with the new telecommunication provider on the device. Executing the device's partial reset comprises changing a value in the files associated with the reusable data and preserving the files from further alteration. The files that are not associated with reusable data are deactivated, reconfigured, or reset to factory default settings.

Referring now to FIG. 1, there is illustrated a mobile telecommunications reset system 10 according to the present disclosure. The system 10 comprises a mobile device 100 that is configured to selectively communicate with at least one of a first network 12 and a second network 14. A mobile device 100 may be a mobile phone, a personal digital assistant (PDA), a media player, tablet, or other mobile communication device without limitation. Mobile device 100 comprises user interface 110, processor 120, and a storage medium 130.

The storage medium 130 comprises a non-transitory computer readable storage medium. The storage medium 130 may be divided or partitioned into a first partition 131 and a second partition 132. The first partition 131 and the second partition 132 may be physically separate storage mediums. Alternatively, the first partition 131 and the second partition 132 may be virtually separate memory volumes on the same storage medium. In instances, the first partition 131 comprises the carrier partition for storing software implemented in accessing a provider's telecommunications network and the functions of applications installed on the device. Likewise, the second partition 132 comprises the user partition for storing software and applications downloaded and installed by the user. The storage medium 130 comprises receiving module 140, parsing module 150, and execution module 160. The receiving module 140, parsing module 150, and execution module 160 may be on either, both, or none of the partitions.

In embodiments, the original or first network 12 and the new or second network 14 comprise any telecommunications networks configured for mobile device 100 access. Generally, a first network provider 22 operates first network 12, and a second network provider 24 operates second network 14. The second network provider 24 may be a brand or subsidiary related to the first network provider 22, or a competing provider, without limitation. Originally, the device 100 is configured to operate in communication with the first network 12.

In embodiments, processor 120 receives user inputs via the user interface 110, to reconfigure the device 100 for operation in communication with the second network 14. Alternatively, the processor 120 receives commands from either the first network 12 or the second network 14 to reconfigure the device 100 accordingly. The processor 120 executes instructions in the receiving module 140 on the storage medium 130 to receive a payload from the second network provider 24. The processor 120 subsequently accesses the parsing module 150 to identify and locate files on the storage medium 130, for example on the first partition 131 or the second partition 132. The processor 120 accesses the execution module 160 in order to partially reset and reconfigure the mobile device 100 for communications with the second mobile telecommunications network 14 from the network provider 24.

Figure 2:
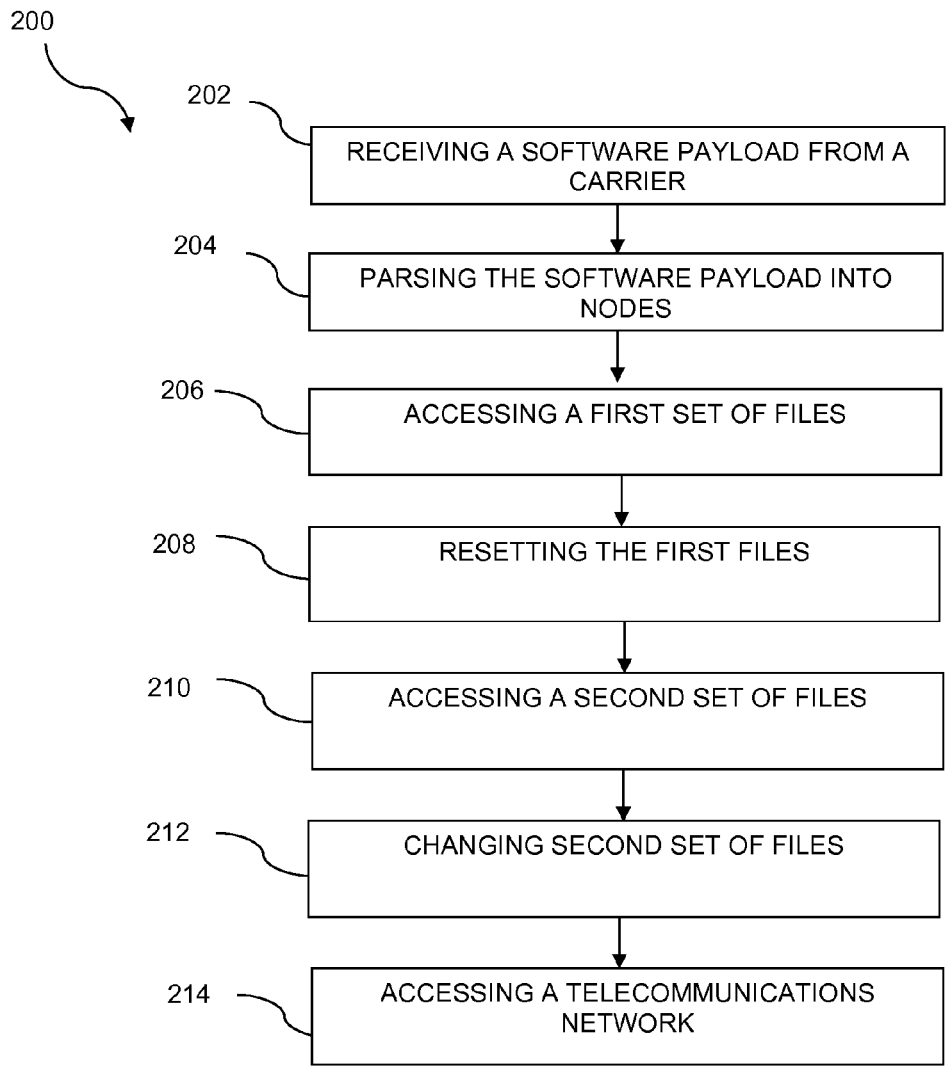
FIG. 2 illustrates an exemplary telecommunications device reconfiguration method according to an embodiment of the disclosure.

Referring now to FIG. 2 there is illustrated a method for reconfiguring a mobile telecommunications device. Generally the reconfiguring method 200 relates to partially resetting a mobile device to the factory default settings. The reconfiguring method 200 comprises receiving a software payload from a provider 202, parsing the software payload into nodes 204, accessing a first set of files associated with a first set of nodes 206, resetting the first set of files 208, accessing a second set of files associated with a second set of nodes 210, and changing at least one value within the second set of files 212. The method further comprises accessing a telecommunications network 214. In some configurations, accessing a telecommunications network 214 further comprises directing the user to a newly contracted service provider. Further, in some configurations accessing a telecommunications network 214 comprises initializing the mobile device.

Receiving a software payload from a provider 202 comprises receiving instructions for at least partially reconfiguring the mobile device. Also, at receiving a software payload from a provider 202 comprises receiving files for installation on the mobile device. Generally, the software payload comprises an open mobile alliance-device management (OMA-DM) payload. Without limitation by theory, receiving a software payload from a provider 202 comprises receiving an extensible markup language (XML) file from a provider. The instructions and files in the software payload comprise nodes. Nodes comprise values within the files of an operating system, such that the files may be manipulated, executed, installed, or stored on a device.

Parsing the software payload into nodes 204 comprises selectively manipulating the data in the extensible markup language (XML). More specifically, parsing the software payload into nodes 204 comprises identifying a first set of files and a second set of files. Further, parsing the software payload into nodes 204 comprises identifying values to change, reset, or delete in the respective software files in the software payload, on the device, or a combination thereof. In instances, parsing the software payload in nodes 204 further comprises identifying new software files or values to install on the device's storage medium. In instances, identifying new software files comprises identifying provider specific files in the software payload.

Accessing a first set of files associated with a first set of nodes 206 comprises locating the first set of files on the device's storage medium. In instances, locating the first set of files comprises locating the respective files on the storage medium. For example locating the first set of files on the storage medium first partition, the second partition, or a combination thereof. Accessing a first set of files associated with the first set of nodes 206 generally comprises accessing files associated with a provider's telecommunications network. In further instances, accessing files associated with a provider's telecommunications network comprises accessing files on the carrier partition.

Resetting the first set of files 208 comprises returning the first set of files to the factory default setting. In instances, a factory default setting may be any setting or software condition that indicates the device has not been used in communication with a telecommunications provider or the provider's network. More specifically, resetting the first set of files 208 comprises returning the set of software files to their original state prior to the installation of a provider's software, software packages, or applications. In instances, resetting the first set of files 208 comprises moving a software file from the carrier partition of the storage medium to the user partition of the storage medium, or vice versa. Alternatively, resetting the first set of files 208 comprises changing a value indicative of the files installation or location on the device's storage medium. In certain instances, resetting the first set of files 208 comprises hiding, caching, deactivating, deleting, or otherwise removing the first set of files 208 from the device's storage medium.

Accessing a second set of files associated with a second set of nodes 210 comprises locating the second set of files on the device's storage medium. In instances, locating the second set of files comprises locating the respective files on the storage medium. For example locating the second set of files on the storage medium first partition, the second partition, or a combination thereof. Accessing a second set of files associated with the second set of nodes 210 generally comprises accessing files associated with third-party, generic, or shared applications, and the like. In instances, accessing a second set of files associated with a second set of nodes 210 comprises accessing stored, saved, or cached provider identification and user identification in the application files on the user partition. In some instances, accessing application files comprises accessing files for applications that are preloaded on a carrier partition of the device storage medium.

Changing at least one value within the second set of files 212 comprises altering a default or factory reset indicator within the second set of files. In instances, altering a default or factory reset indicator within the second set of files comprises preserving the second set of files on the device memory for use with a new provider, the new provider software payload, and the new provider telecommunications network. In certain instances, preserving the second set of files further comprises preventing the stored, saved, or cached provider identification and user identification in the application files from being deleted or removed from the storage medium. In further instances, altering a default or factory reset indicator within the second set of files comprises changing a binary file on the user partition or the carrier partition.

Accessing a telecommunications network 214 comprises transmitting and receiving data. In instances, the telecommunications network provider is the same provider that transmitted the software payload. Alternatively, the telecommunications network is a brand or entity associated with a third party that transmitted the software payload. In certain instances, accessing a telecommunications network 214 comprises reinitializing a mobile device by restarting or briefly depowering a mobile device.

It is understood that the values and/or parameters that are said to be stored in or a part of one or more files may be a value and/or parameter stored in a memory location that is accessible to the file, files, or applications. As one skilled in the art will appreciate, an application may be stored in memory in the form of a file. When an application is executed, some of the context or parameter settings governing the execution of the application may be stored in a portion of memory allocated for the execution variables of the active application. Alternatively, some of the context or parameter settings governing the execution of the application may be stored in any portion of memory.

Figure 3:
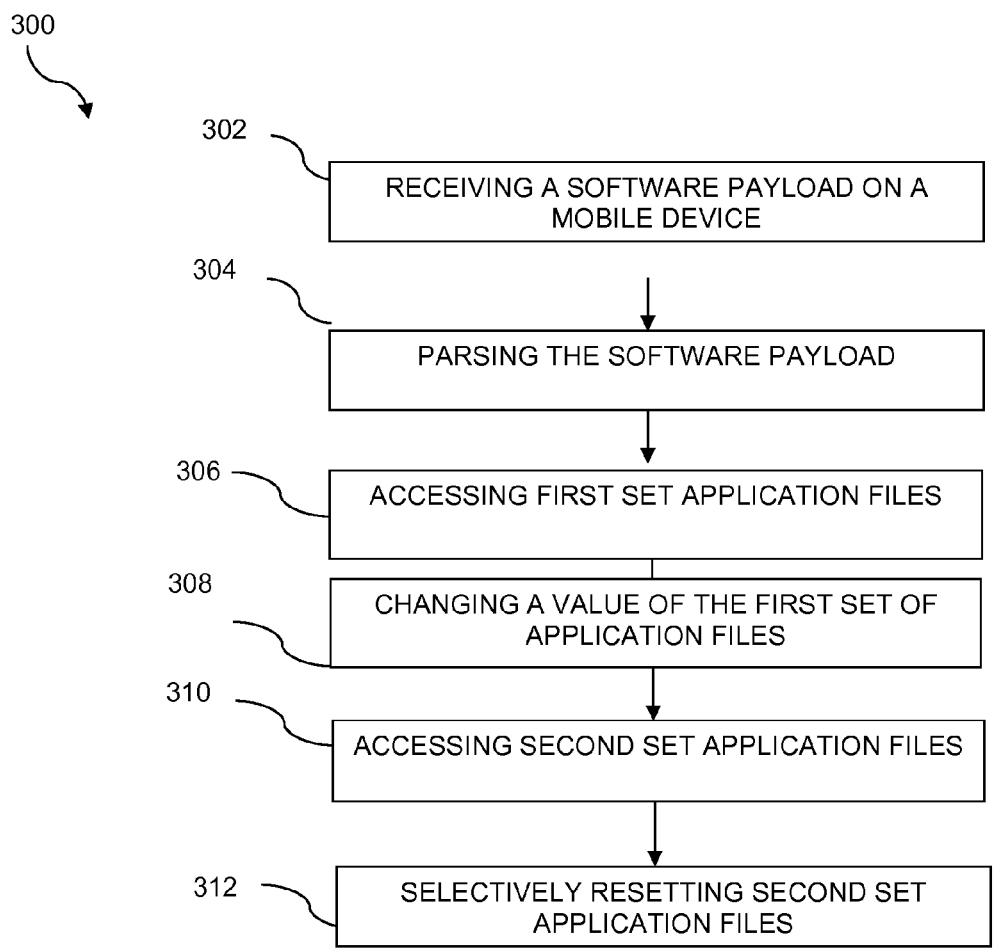
FIG. 3 illustrates an exemplary method for partially resetting applications on a mobile device according to an embodiment of the disclosure.

Referring now to FIG. 3, there is illustrated a method for selectively resetting applications 300 on a mobile device, for example on a mobile device. The method comprises, receiving a software payload on a mobile device parsing a software payload 302, accessing a first set of application files 306, changing at least one value within the first set of application files 308, accessing a second set of application files 310, and selectively resetting the second set of application files 312. Generally, the first set of application files are unchanged or preserved during the step of resetting the second set of application files 312. In certain instances the method for selectively resetting the applications 300 may be a method for partially reprovisioning a mobile device.

Receiving a software payload from a provider 302 comprises receiving instructions for at least partially reconfiguring the mobile device. Also, receiving a software payload from a provider 302 comprises receiving applications files for installation on the mobile device. Generally, the software payload comprises an open mobile alliance-device management (OMA-DM) payload and associated software applications files.

Without limitation by theory, receiving a software payload from a provider 302 comprises receiving an extensible markup language (XML) file from a provider. The instructions and files in the software payload comprise applications. The applications may be manipulated, executed, installed, or stored on a device.

Parsing the software payload 304 comprises selectively manipulating the data in the extensible markup language (XML). More specifically, parsing the software payload 304 comprises identifying a first set of application files and a second set of application files. Further, parsing the software payload 304 comprises identifying values to change, reset, or delete in the respective application files in the software payload, on the device, or a combination thereof. In instances, parsing the software payload 304 further comprises identifying new software applications files or values to install on the device's storage medium. In instances, identifying new software applications files comprises identifying provider specific applications files in the software payload to be installed on the user partition or the carrier partition of the storage medium.

Accessing a first set of application files 306 comprises locating the first set of files on the device's storage medium. For example locating the first set of files on the storage medium first partition, the first partition, or a combination thereof. Accessing a first set of applications files 306 generally comprises accessing files associated with third-party, generic, or shared applications, and the like. In instances, accessing a first set of applications files 306 comprises accessing stored, saved, or cached provider identification and user identification in the application files. In some instances, accessing application files comprises accessing preloaded files on a user partition or a carrier partition of the device storage medium.

Changing at least one value within the first set of applications files 308 comprises altering a default or factory reset indicator within the first set of applications files. In instances, altering a default or factory reset indicator within the first set of applications files comprises preserving the first set of applications files on the device memory for use with a new provider, the new provider software payload, and the new provider telecommunications network. In certain instances, preserving the first set of applications files further comprises preventing the stored, saved, or cached provider identification and user identification in the application files from being deleted or removed from the storage medium. In further instances, altering a default or factory reset indicator within the first set of applications files comprises changing a binary file on the user partition or the carrier partition.

Accessing a second set of applications files 310 comprises locating the second set of files on the device's storage medium. For example locating the second set of files on the storage medium first partition, the second partition, or a combination thereof. Accessing a second set of applications files 310 generally comprises accessing files associated with a past provider's network. In further instances, accessing applications files associated with a past provider's network comprises accessing files on the carrier partition or the user partition.

Selectively resetting the second set of applications files 312 comprises returning them to a factory default setting. In instances, a factory default setting may be any setting or software condition that indicates the device or the applications files have not been used in communication with a telecommunications provider or the provider's network. More specifically, selectively resetting the second set of applications files 312 comprises returning only the second set of applications files to their original state prior to the installation of another provider's software, software packages, or applications. In instances, resetting the second set of files 312 comprises moving a software file from the user partition of the storage medium, to the carrier partition of the storage medium, or vice versa. Alternatively, resetting the second set of applications files 312 comprises changing a value indicative of the applications files installation or location on the device's storage medium. In certain instances, resetting the second set of files 312 comprises hiding, caching, deactivating, deleting, or otherwise removing the second set of applications files from the device's storage medium. As may be understood, selectively resetting the second set of application files 312 further comprises maintaining the first set of application files in the changed state, without a reset, re-initialization, or other operations, without limitation.

Figure 4:
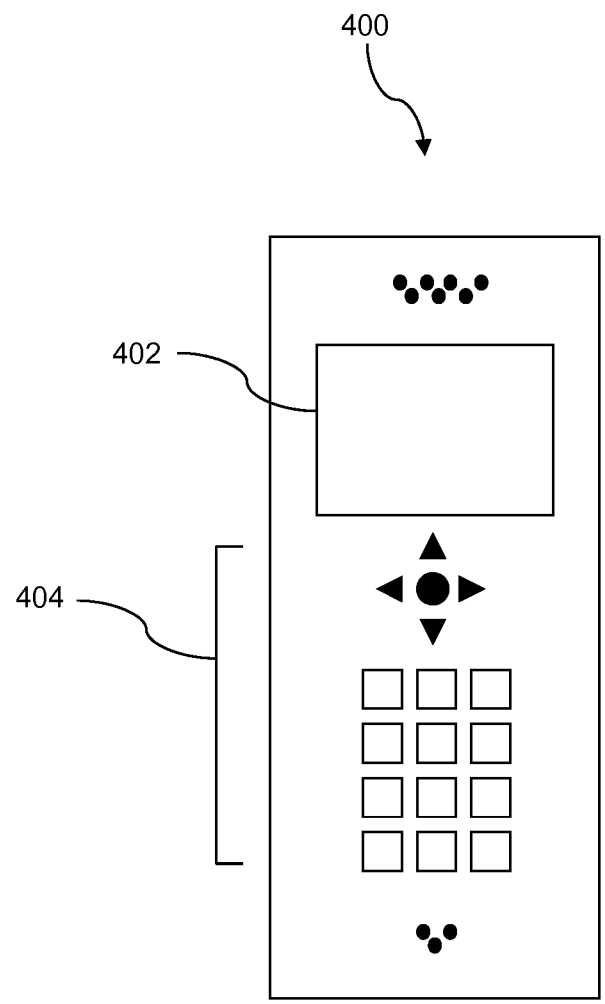
FIG. 4 is an illustration of a mobile communication device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the mobile device. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
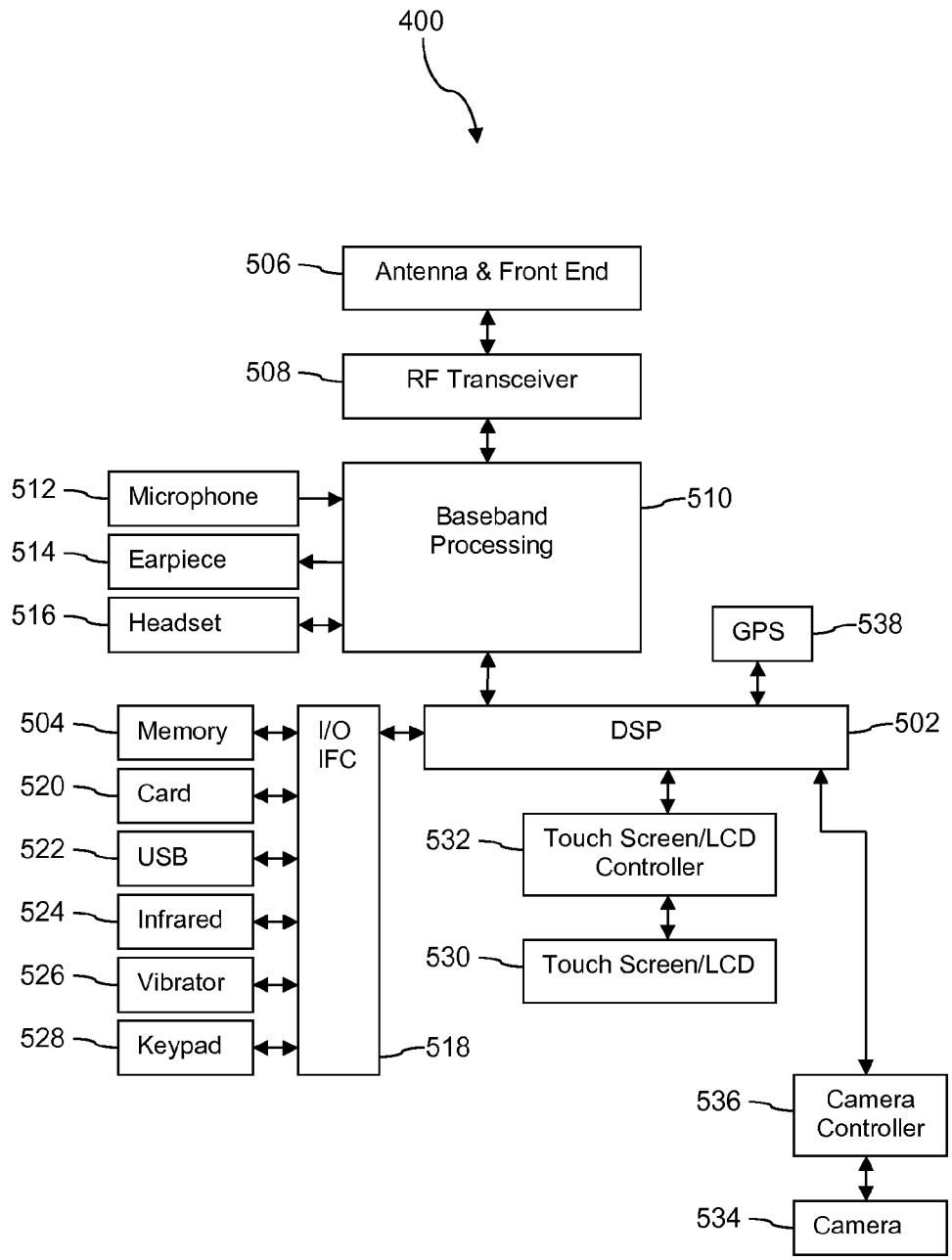
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information provider media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
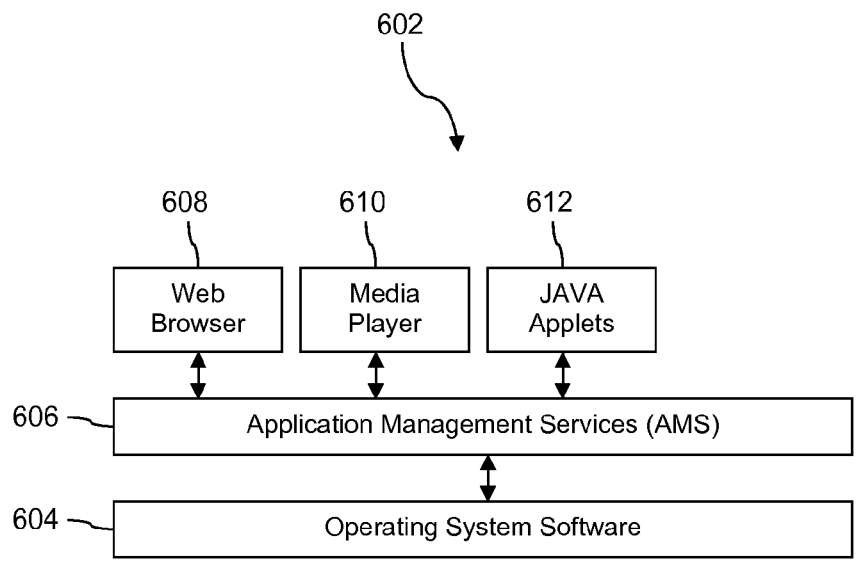
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
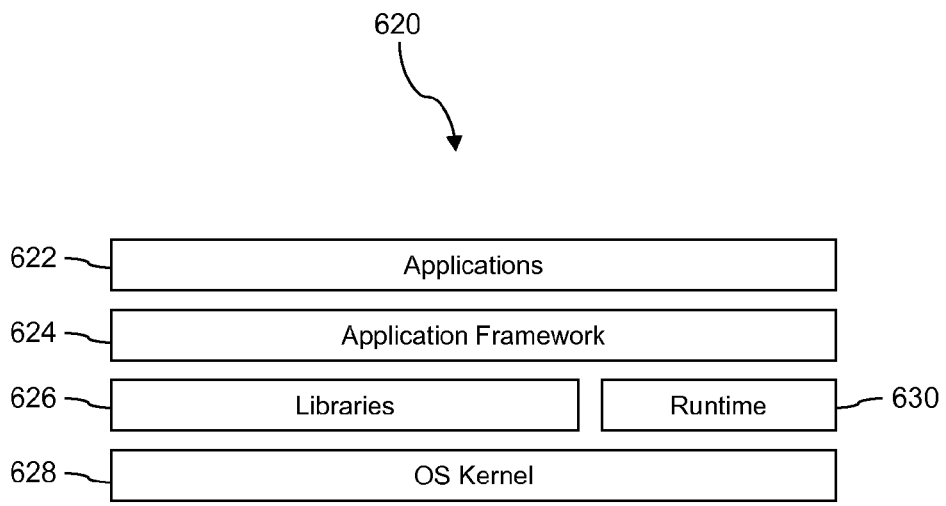
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
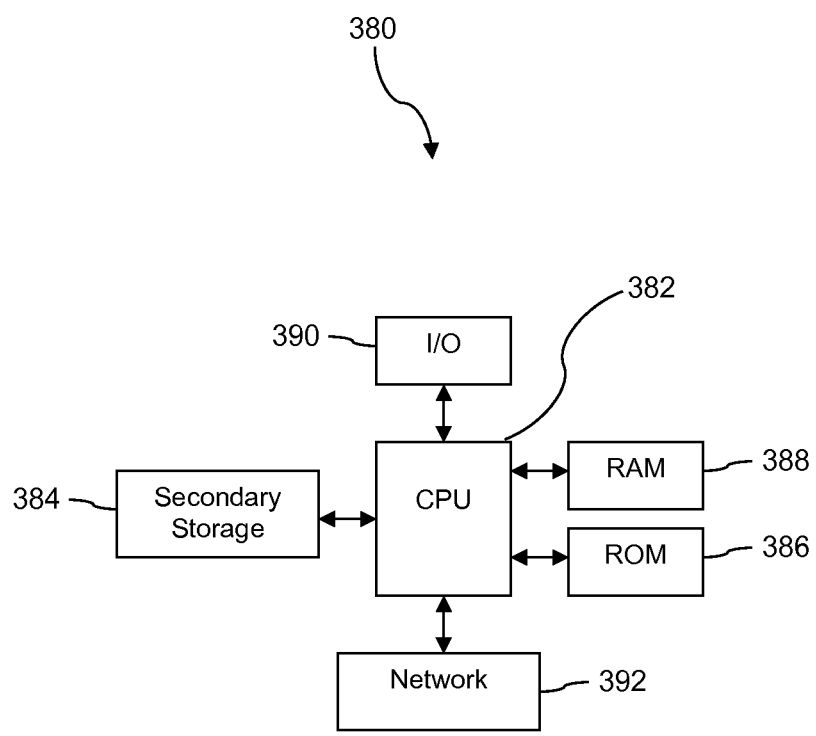
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a provider wave.

Such information, which may include data or instructions to be executed using processor 382 for example, may be received from and outputted to the network, for example, in the form of a computer data baseband signal or signal embodied in a provider wave. The baseband signal or signal embedded in the provider wave, or other types of signals currently used or hereafter developed, may be generated according to several methods well known to one skilled in the art. The baseband signal and/or signal embedded in the provider wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method for reconfiguring a mobile device, comprising:
    receiving, in a carrier partition of the mobile device, a software payload that comprises data to reconfigure the mobile device from a server at a provider, wherein the mobile device comprises non-transitory memory having the system partition, a user partition, and a carrier partition;
    parsing, by a parsing engine of the mobile device, the software payload for a plurality of nodes, wherein the nodes are software packages or individual parameters stored within the software payload that are defined by the provider and associated with reconfiguring the mobile device;
    determining, by the parsing engine based on using a first set of nodes of the plurality of nodes, that a first set of files includes reusable data for a telecommunications network of the provider, wherein the first set of files is stored in the carrier partition;
    accessing, by an execution engine of the mobile device, the first set of files in the carrier partition based on the first set of nodes;
    partially resetting, by an execution engine of the mobile device, the mobile device to factory default setting within the first set of files by changing a value associated with the reusable data, wherein partially resetting occurs without reinstalling the first set of files;
    accessing, by the execution engine, a second set of files associated with a third-party application, a provider identification, and a user identification, wherein the second set of files is stored in the user partition and accessed based on a second set of nodes of the plurality of nodes;
    changing, by the execution engine, at least one value within the second set of files for use on the telecommunication network;
    preserving the second set of files in the non-transitory memory for use with the telecommunications network of the provider; and
    accessing, by the mobile device, the telecommunications network based on at least the first set of files, the second set of files, or any combination thereof.

2. The method of claim 1, wherein receiving the software payload from the provider comprises receiving an extensible markup language file from the provider.

3. The method of claim 1, wherein parsing the software payload comprises selectively executing a portion of the nodes.

4. The method of claim 1, wherein accessing the second set of files associated with the second set of nodes comprises accessing application files that are preloaded on the user partition or the carrier partition of the non-transitory memory.

5. The method of claim 4, wherein accessing application files that are preloaded on the user partition or the carrier partition of the non-transitory memory comprises altering application files that have cached client identifications or user identifications on the device memory.

6. The method of claim 1, wherein changing the at least one value within the second set of files comprises altering a default or factory reset indicator within the second set of files.

7. The method of claim 6, wherein altering a default or factory reset indicator within the second set of files comprises reconfiguring a client identification or the user identification on the non-transitory memory for use with new provider software.

8. A mobile communication device, comprising:
  a non-transitory memory comprising a carrier partition, system partition, and a user partition;
  a processor coupled to the non-transitory memory; and
  an application stored in the non-transitory memory that, upon execution by the processor, configures at least the processor to:
    receive a software payload from a server at a provider,
    parse the software payload for a plurality of nodes, wherein the plurality of nodes are software packages or individual parameters within the software payload that are defined by the provider and associated with reconfiguration of the mobile device,
    based on a first set of nodes of the plurality of nodes, determine that a first set of files includes reusable data for a telecommunications network of the provider,
    access the first set of files based on the first set of nodes,
    change at least one value within the first set of files via the first set of nodes, wherein the at least one value is associated with the reusable data,
    access a second set of files associated with a third-party application, a provider identification, and a user identification, wherein the access is based on a second set of nodes of the plurality of nodes,
    reconfigure the second set of files to a factory default setting by use of the second set of nodes that preserves at least the provider identification and the user identification in the second set of files,
    partially reset the mobile device to factory default setting based on change of the at least one value in the first set of files and reconfiguration of the second set of files, and
    access the telecommunications network responsive to the partial reset.

9. The device of claim 8, wherein the mobile communication device is one of a mobile phone, a personal digital assistant, a wireless enabled computer, or a media player.

10. The device of claim 8, wherein the software payload further comprises an extensible markup language file defined by the provider.

11. The device of claim 8, wherein the first set of files is stored on the user partition of the non-transitory memory and the second set of files is stored on the carrier partition of the non-transitory memory.

12. The device of claim 11, wherein the application further configures the processor to selectively identify files on the carrier partition and the user partition according to the nodes.

13. The device of claim 8, wherein the application further configures the processor to identify application files that have cached client identification, user identification, or any combination thereof.

14. The device of claim 13, wherein change of the at least one value within the first set of files preserves at least the cached client identification or the user identification without a reset of the entire mobile device.

15. The device of claim 14, wherein the application further configures the processor to partially reconfigure the mobile device for use with the telecommunication network responsive to preservation of at least the client identification or the user identification, wherein the provider of the telecommunication network is different from a previous provider used by the mobile device.

16. A method for selectively resetting applications on a mobile device, comprising:
  parsing, by a parsing engine of the mobile device, a software payload for a plurality of nodes, wherein the nodes are software packages or individual parameters stored within the software payload that are defined by a new provider, and wherein the mobile device comprises a non-transitory memory having a system partition, a user partition, and a carrier partition;
  determining, by the parsing engine based on using a first set of nodes of the plurality of nodes, that a first set of application files includes reusable data for a telecommunications network, wherein the first set of files is stored in the carrier partition;
  accessing, by an execution engine of the mobile device, the first set of application files based on the first set of nodes;
  changing, by the execution engine, at least one value within the first set of application files for use on the telecommunication network;
  based on changing at least one value within the first set of application files, partially resetting, by an execution engine of the mobile device, the mobile device to factory default setting in the first set of application files;
  accessing, by the execution engine using the second set of nodes of the plurality of nodes, a second set of application files based on an association with at least a user identification and a client identification;
  selectively resetting, by the execution engine using the second set of nodes, the second set of application files;
  preserving the second set of files in the non-transitory memory for use with the telecommunications network of the new provider; and
  accessing, by the mobile device, the telecommunications network without a reset of the entire mobile device, wherein the accessing is based on the partially resetting the mobile device and the selectively resetting the second set of application files, and wherein the telecommunication network is associated with the new provider that is different from a previous provider used by the mobile device.

17. The method of claim 16, further comprising:
  prior to the parsing the software payload, receiving, on the mobile device, the software payload via the telecommunications network; and
  responsive to the parsing, identifying, by a parsing engine of the mobile device, application files that are preloaded on the non-transitory memory of the mobile device.

18. The method of claim 16, wherein accessing a first set of application files comprises identifying application files that have a client identification or user identification.

19. The method of claim 18, wherein changing the at least one value within the first set of files comprises preserving the client identification or user identification on the carrier partition.

20. The method of claim 19, wherein changing the at least one value within the first set of application files further comprises altering a reset indicator.

* * * * *